United States Patent
Kolli et al.

(10) Patent No.: US 7,363,451 B2
(45) Date of Patent: Apr. 22, 2008

(54) LOAD BALANCING OF DISK DRIVES

(75) Inventors: Neela Syam Kolli, Lawrenceville, GA (US); Ajitabh Prakash Saxena, Duluth, GA (US); Hardy Doelfel, Cumming, GA (US)

(73) Assignee: LSI Logic Corporation, Milpitas, CA (US)

( * ) Notice: Subject to any disclaimer, the term of this patent is extended or adjusted under 35 U.S.C. 154(b) by 269 days.

(21) Appl. No.: 11/248,378

(22) Filed: Oct. 11, 2005

(65) Prior Publication Data

US 2007/0083703 A1    Apr. 12, 2007

(51) Int. Cl.
*G06F 12/00* (2006.01)

(52) U.S. Cl. ............... 711/167; 711/100; 711/4; 711/111; 711/112; 718/105

(58) Field of Classification Search ............... 711/167, 711/100, 4, 111, 112; 718/105
See application file for complete search history.

(56) References Cited

U.S. PATENT DOCUMENTS

2006/0212873 A1*  9/2006  Takahisa ............... 718/105
2006/0288184 A1* 12/2006  Riska et al. ............. 711/167

\* cited by examiner

*Primary Examiner*—Kimberly Mclean
(74) *Attorney, Agent, or Firm*—North Weber & Baugh

(57) ABSTRACT

System and methods are disclosed for load balancing Input/Output (IO) commands to be executed by one or more disk drives from an array of disk drives. Systems and methods disclosed herein use one or more properties, such as disk drive RPM, disk drive cache, command queue lengths, real-time drive data, and head position to provide load balancing of Input/Output commands.

17 Claims, 7 Drawing Sheets

LOAD BALANCING OF DISK DRIVES

BACKGROUND

A. Technical Field

The present invention relates generally to the field of data storage, and more particularly, to load balancing of storage devices.

B. Background of the Invention

Computer systems often include some form of data storage system to record and access data. Storage systems typically employ a disk drive on which data is stored and from which data may be retrieved.

Because disk failures are not uncommon and because loss of data can have catastrophic results, some computer systems employ an array of disk drives. A common implementation of arrays of disk drives is known as "RAID," which stands for "Redundant Array of Independent Disks" or "Redundant Array of Inexpensive Disks." The various RAID configurations are different ways for redundantly storing data on multiple disk drives. RAID systems can provide improved performance, improved fault tolerance for disk failures, or both.

A number of RAID techniques or configurations exist, but examples of different RAID configurations include RAID-0, RAID-1, and RAID-5. The RAID-0 technique employs striping, in which the data is segmented into blocks and each block is written to a separate disk drive. RAID-0 offers good performance because data can be written to or read from multiple drives, but it is not fault tolerance because there is no redundancy of data.

The RAID-1 technique uses disk mirroring and duplexing. It consists of at least two drives that duplicate the stored data. RAID-1 does not employ striping. The RAID-1 technique improves performance because either disk can be read at the same time.

The RAID-5 configuration, one of the most commonly used RAID techniques, uses block-level striping with a parity array distributed across the disks. The parity data, although not strictly redundant data, can be used to reconstruct data. RAID-5 improves performance because all read and write operations may be overlapped.

RAID arrays may also be nested. An example of a nested RAID array is RAID 10, which consists of an array of stripes in which each stripe is a RAID-1 array of drives.

Although disk drive technologies continue to evolve and develop greater capacity, load balancing for storage systems, such as RAID systems, has not substantially evolved. Accordingly, what is needed are systems and methods for providing better load balancing for data storage systems comprising on array of disk drives.

SUMMARY OF THE INVENTION

In general, exemplary embodiments of the invention are concerned with load balancing of commands to an array of disk drives.

System and methods are disclosed for load balancing Input/Output (IO) commands to be executed by one or more disk drives from an array of disk drives. Systems and methods disclosed herein use one or more properties, such as disk drive RPM, disk drive cache, command queue lengths, real-time drive data, and head position to provide load balancing of Input/Output commands.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure (FIG.) 1 depicts a block diagram illustrating an embodiment of a system in which exemplary embodiments of the present invention may operate.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be performed in a variety of ways and using a variety of means, including software, hardware, firmware, or a combination thereof. Accordingly, the embodiments described below are illustrative of specific embodiments of the invention and are meant to avoid obscuring the invention.

Reference in the specification to "one embodiment," "a preferred embodiment," or "an embodiment" means that a particular feature, structure, characteristic, or function described in connection with the embodiment is included in at least one embodiment of the invention. The appearances of the phrase "in one embodiment," "in an embodiment," or the like in various places in the specification are not necessarily all referring to the same embodiment.

Figure 1:
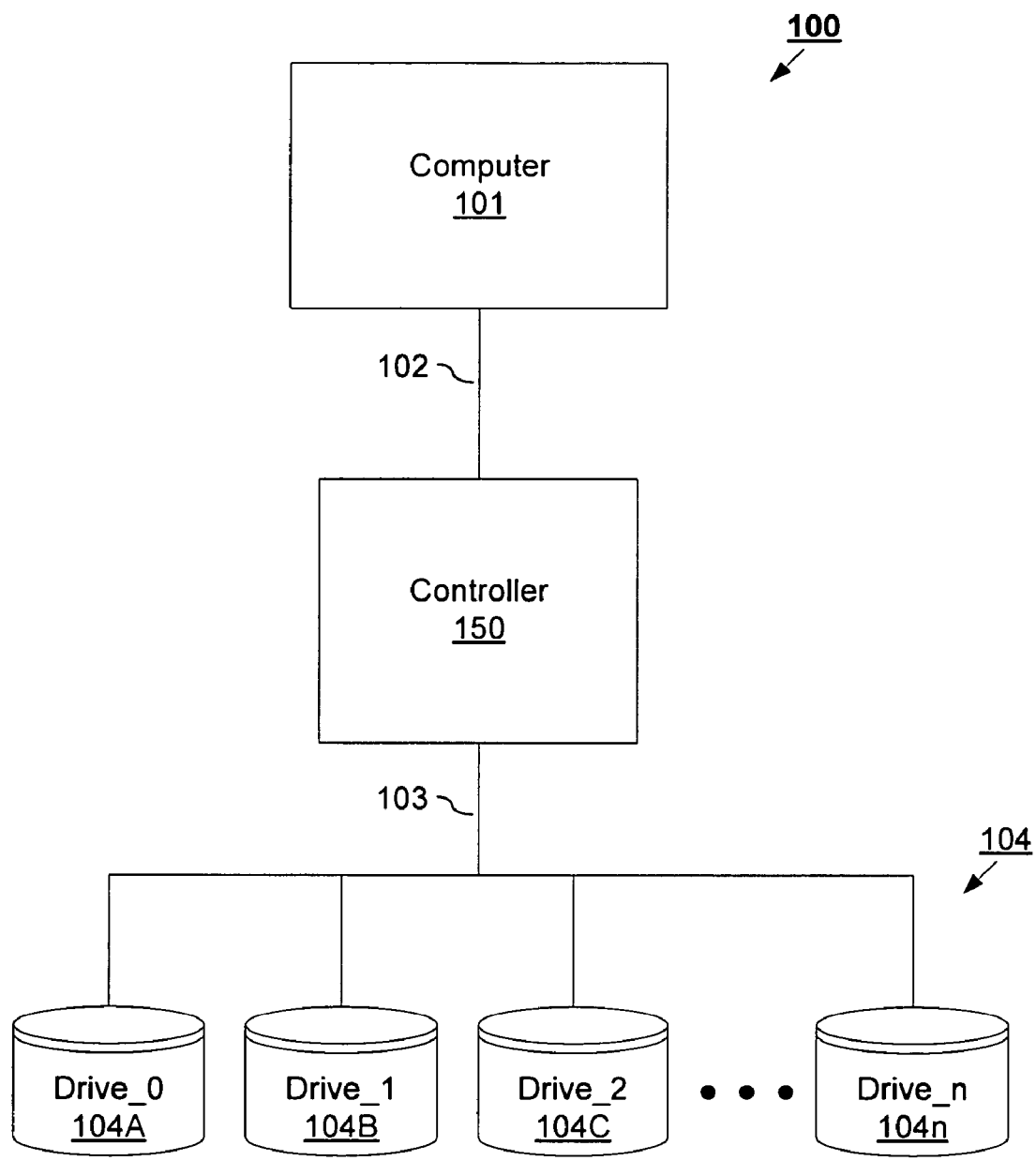

Various systems in accordance with the present invention may be constructed. FIG. 1 is a block diagram illustrating an exemplary system in which exemplary embodiments of the present invention may operate. It shall be noted that the present invention may operate, and be embodied in, other systems as well.

FIG. 1 is a diagram illustrating an exemplary environment for implementation of an embodiment of the present invention. FIG. 1 depicts a block diagram comprising a system 100 utilizing an array of disk drives 104 for data storage according to an embodiment of the present invention. System 100 includes a host computer 101 communicatively coupled across an interface 102 to a controller 150. Throughout this written description, the terms "coupled" and "communicatively coupled" shall be understood to include direct connections and indirect connections through one or more intermediary devices or components.

Computer 101 may be any type of apparatus having a processor coupled to a memory (not shown) for retrieving data and for executing instructions stored in the memory. Such instructions may include instructions used to perform I/O (Input/Output) commands or operations with respect to one or more of the disk drives 104A-104n in the array of disk drives 104.

Controller 150 may be a disk array controller for controlling I/O commands with respect to one or more of the disk drives 104A-104n in the array of disk drives 104. Controller 150 is communicatively coupled across interface 103 to an array of disk drives 104. Disk drives 104A-104n in the array of disk drives 104 may include one or more of the following: magnetic disks, optical disks, solid-state disks, or non-volatile electronic storage elements. Controller 150 may include a processor (not shown) for fetching data and instructions stored in memory (not shown) to perform or execute commands, including I/O operations and coordinating data management operations across the array of disk drives 104.

Figure 2:
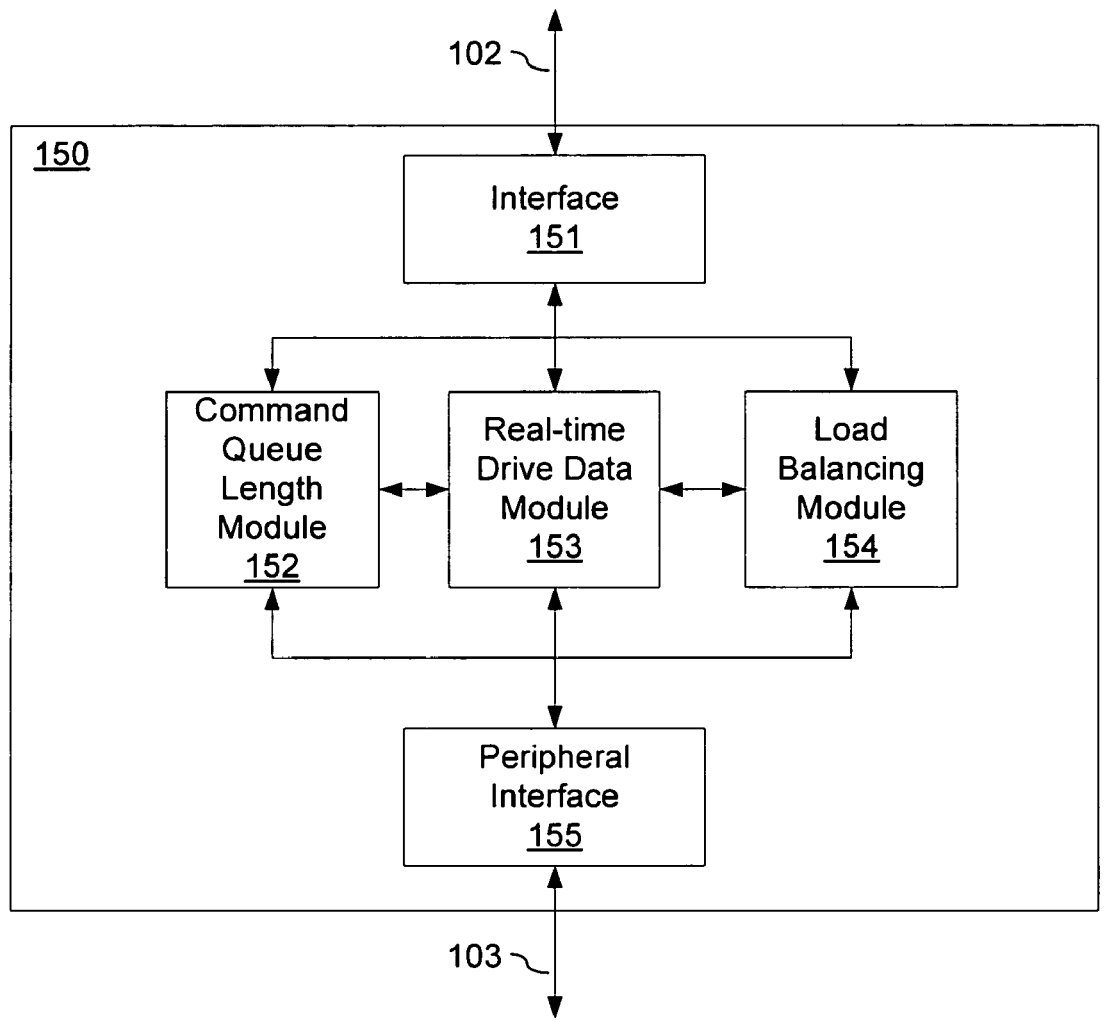
FIG. 2 depicts a functional block diagram of an embodiment of controller 150 according to an embodiment of the present invention.

FIG. 2 depicts a functional block diagram on an embodiment of controller 150 according to an embodiment of the present invention. In an embodiment, controller 150 includes an interface 151 to communicatively couple with computer 101 and a peripheral interface 155 to communicatively couple with the array of disk drives 104. Controller 150 also includes command queue length module 152, real-time drive data module 153, and load balancing module 154, the functionality of which will be described in more detail below. In an embodiment, all of these modules may communicate with each other and with the interfaces 151 and 155. Each module may be implemented in software, hardware, firmware, or any combination thereof. It shall be noted all or part of the functionality of each of the modules may be combined together or divided into sub-modules. In an embodiment, all or part of the functionality of the modules in controller 150 may be performed by one or more of the following: computer 101, one or more of the drives in the array of disk drives 104, and controller 150.

Figure 3:
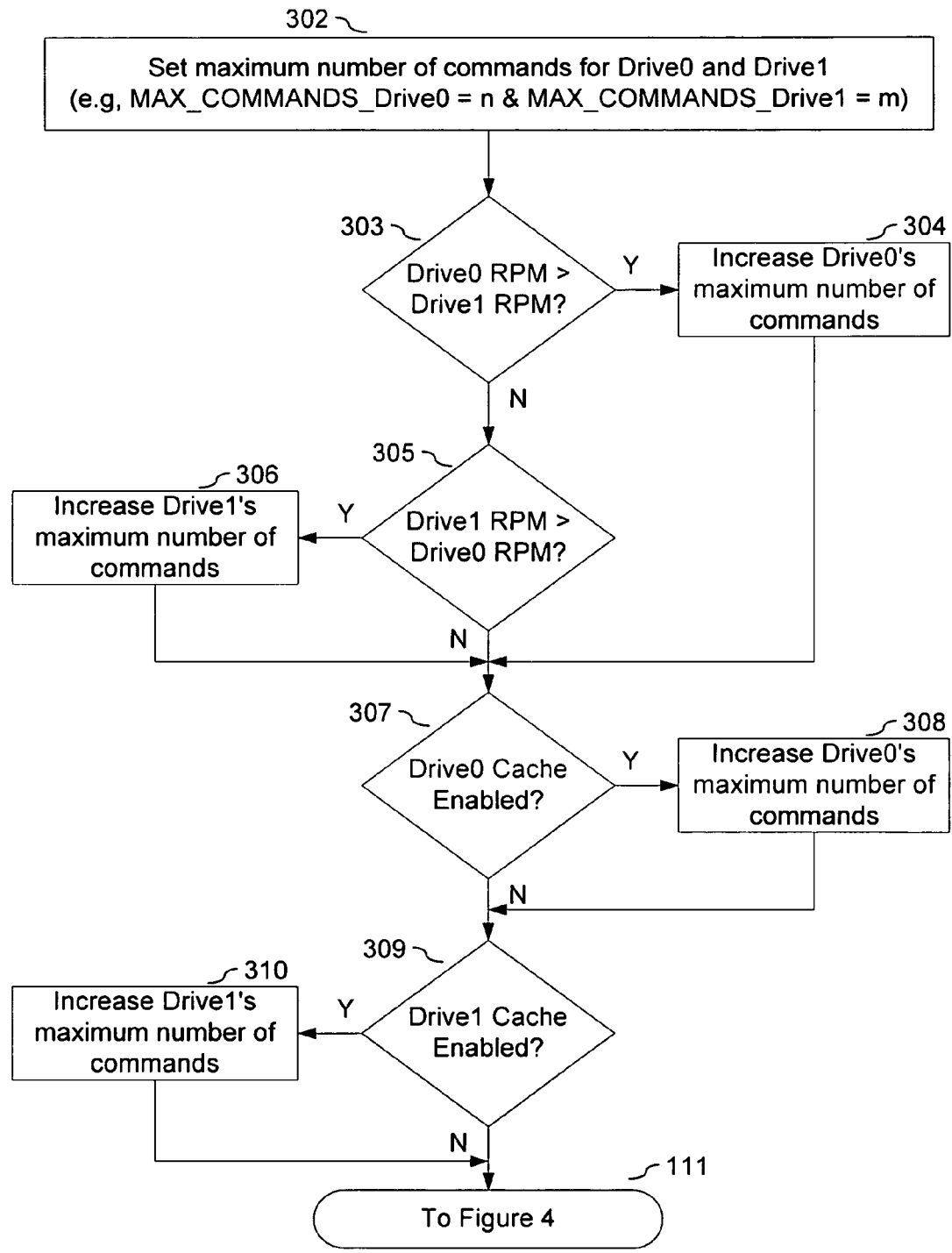
FIG. 3 illustrates an embodiment of a method for setting the command queue length for disk drives based on disk drive rotations per minute ("RPM") and disk drive cache according to an embodiment of the present invention.

FIG. 3 illustrates an embodiment of a method for setting the command queue length for disk drives, which may be performed by command queue length module 152 according to an embodiment of the present invention. The method depicted in FIG. 3 commences with initializing (302) the maximum number of commands a disk drive may have in its queue. The number may be an absolute number or may be a number of command per a specified time period, such as X number of commands per second. The number may be any number 1-n and may be predefined or selected by a user. In an embodiment, the initial number of commands may be the same for all disk drives. In an alternative embodiment, one or more of the disk drives may be initialized with different values.

The disk drive speeds (RPM) are compared. Assume for the purposes of illustration and without loss of generality, an array consisting of two disk drives, Drive0 and Drive1. One skilled in the art will recognize that the present invention may be applied to disk arrays with a greater number of disk drives. The speed of Drive0 is compared (303) with Drive1. If Drive0 is faster than Drive1, the maximum number of commands Drive0 may have in its queue is increased (304) by a number from 1-n. In an embodiment, the amount of increase in Drive0's command queue length is a predetermined amount. In an alternative embodiment, the amount of increase in Drive0's command queue length may be selected by a user. In yet another embodiment, the amount of increase in Drive0's maximum queue length may be related to the amount the speed varies between the disk drives.

The speed of Drive1 is compared (305) against Drive0. If Drive1 is faster than Drive0, the maximum number of commands Drive1 may have in its queue is increased (306) by a number from 1-n. In an embodiment, the amount of increase in Drive1's command queue length is a predetermined amount. In an alternative embodiment, the amount of increase in Drive1's command queue length may be selected by a user. In yet another embodiment, the amount of increase in Drive1's command queue length may be related to the amount the speed varies between the disk drives.

A determination is made whether the caches of the drives are enabled (307, 309). If the cache of Drive0 is enabled (307), the maximum number of commands Drive0 may have in its queue is increased (308) by a number from 1-n. In an embodiment, the amount of increase in Drive0's command queue length is by a predetermined amount. In an alternative embodiment, the amount of increase in Drive0's command queue length may be selected by a user. In yet another embodiment, the amount of increase in Drive0's command queue length may be related to the amount of cache it possesses. If Drive0's cache is not enabled (307), Drive0's command queue length is not increased and the method progresses to the next step.

This process is repeated for the other disk drives in the array. For example, a determination is made (309) whether the cache of Drive1 is enabled. If the cache of Drive1 is enabled, the maximum number of commands Drive1 may have in its queue is increased (31) by a number from 1-n. In an embodiment, the amount of increase in Drive1's command queue length is by a predetermined amount. In an alternative embodiment, the amount of increase in Drive1's command queue length may be selected by a user. In yet another embodiment, the amount of increase in Drive1's command queue length may be related to the amount of cache it possesses. If Drive1's cache is not enabled (309), Drive1's command queue length is not increased.

One skilled in the art will recognize the method depicted in FIG. 3 may be performed in part only. That is, the maximum command queue length may be adjusted by examining only disk drive speed or by examining only whether the cache is enabled.

Figure 4:
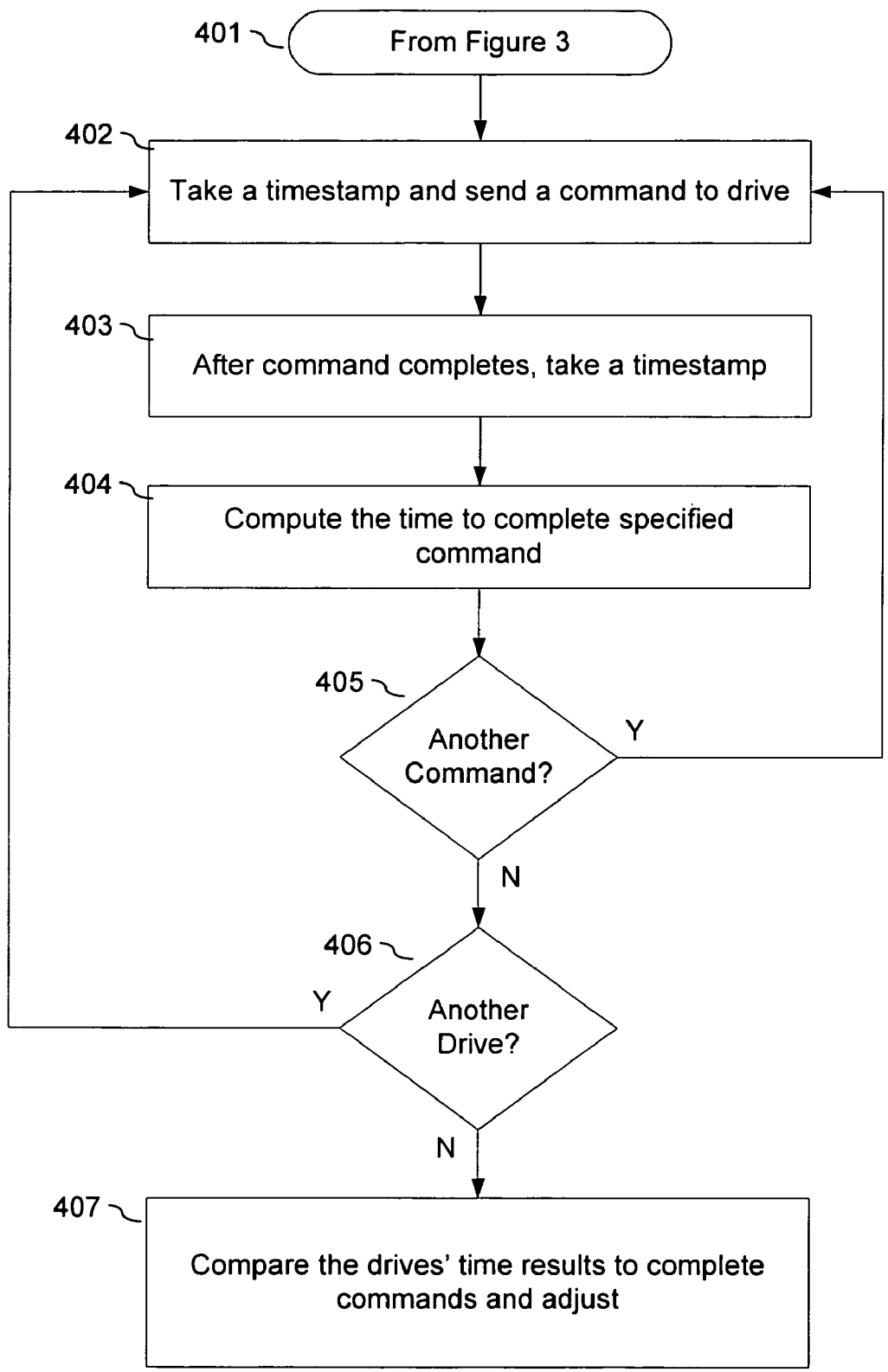
FIG. 4 illustrates an embodiment of a method for setting, adjusting, or both the command queue length for disk drives based on real-time drive data according to an embodiment of the present invention.

FIG. 4 illustrates an embodiment of a method, which may be implemented by real-time drive data module 153, for setting, adjusting, or both, the maximum command queue length for disk drives based on real-time drive data according to an embodiment of the present invention. The method disclosed in FIG. 4 may be employed in addition to or in replacement of the above-disclosed methods for initializing and adjusting the maximum command queue length for each of the disk drives in the array.

Different disk drives, especially disk drives of different makes and models, generally take different amounts of time to complete a particular command. Even given the same hardware parameters (e.g., speed (RPM), Read cache, and Write cache), there typically is a difference in response time. Because in RAID solutions more commands are typically not sent from the operating system of the host computer until the commands complete for all the participating disk drives, it is possible to have conditions where one or more disk drives are underutilized. Accordingly, when dealing with an array of disk drives, failure to compensate for variations among the disk drives may result in misallocation of usage of the disk drives.

In an embodiment, the method depicted in FIG. 4 is used to verify and adjust the results of the command queue lengths after performing (401) one or more of the above-disclosed methods related to FIG. 3. In the embodiment depicted in FIG. 4, a command is timestamped and sent (402) to a disk drive. In an alternative embodiment, a sequence of commands may be sent the disk drive. For example, a sequence of 1K, 4K, 16K, 32K, 64K, and 128K read commands may be sent to the drive. In an embodiment, the driver software may internally generate the commands.

After each command completes, a timestamp is taken (403), and the time the disk drive took to complete the specified command is calculated (404) based upon the difference in time of the two timestamps. This information may be used to compute the time that a particular drive will take to complete a command. In an alternative embodiment, the time to complete a single command may be used to extrapolate the time for other commands, or for a specified time period (e.g., if one command is completed in 10 milliseconds, than the drive can complete 100 commands in one second).

In an embodiment, another command or sequence of commands may be sent (405) to a disk drive. In an embodiment, the command or sequence of commands may be of different types. One reason for sending different commands is because it is possible that the disk drive response is dependent upon the command type. For example, the fastest disk drive for a READ command may not necessarily be the fastest disk drive for a WRITE command. The process (steps 402-405) is repeated until there are no additional commands or sequences of commands to be sent to that particular drive.

The processing of determining response time to complete commands or sequences of commands (steps 402-405) is repeated (406) for each of the drives in the array. After compiling the real-time drive data, the real-time drive data is compared and adjustments may be made to one or more of the disk drives' queue lengths for commands. For example, if, after checking Drive1's RPM and whether its cache is enable, the command queue length for Drive1 may indicate that it can complete 90 commands per minute. Given the real-time drive data, it may be determined that Drive1 completes a command in 0.6 seconds, which means it can complete 100 commands in minute. Accordingly, Drive1's command queue length may be increased by the difference, in this case 10. In an alternative embodiment the command queue length may be increased by some factor based upon the real-time drive data.

Figure 5:
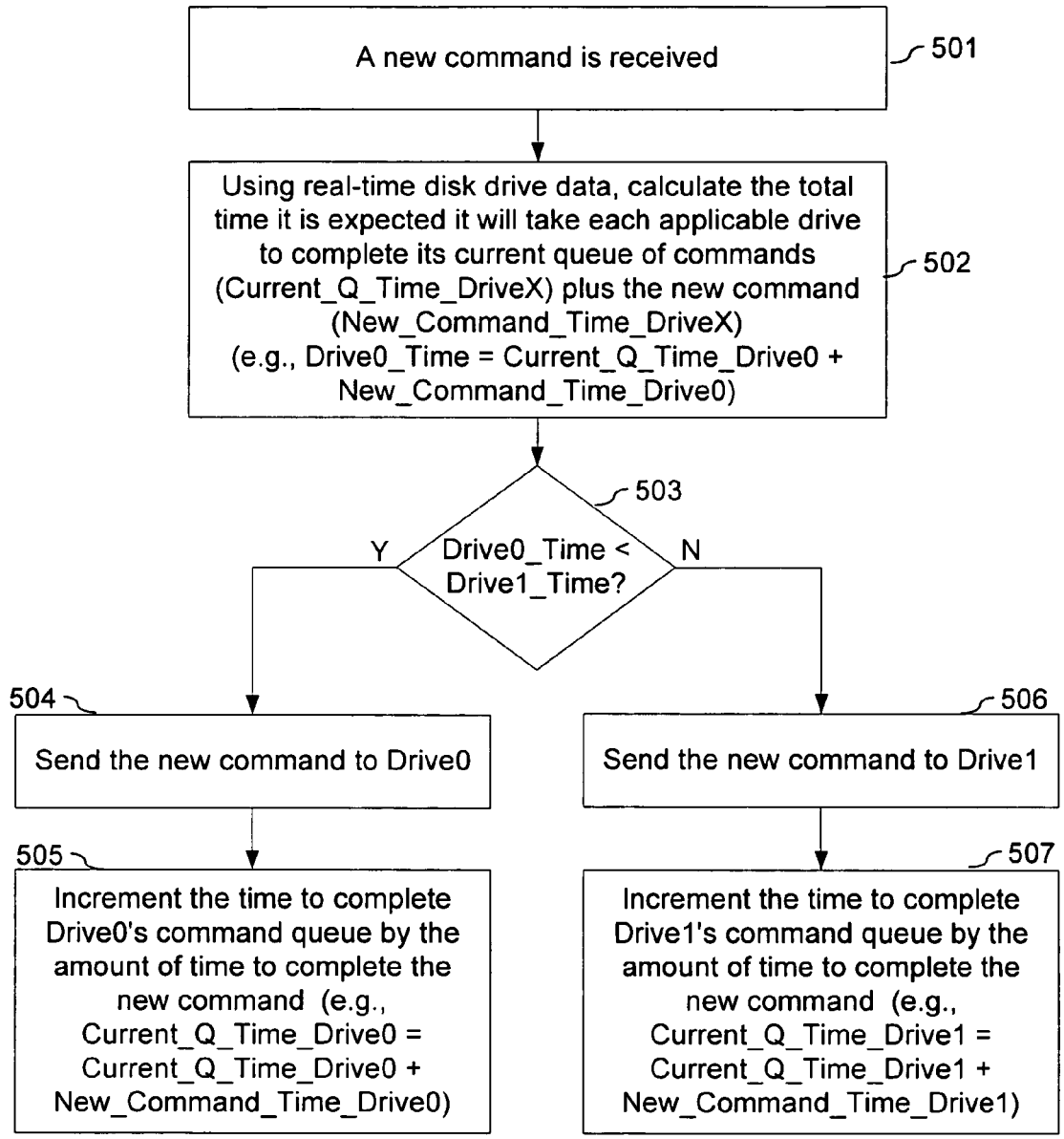
FIG. 5 illustrates an embodiment of a method for load balancing of disk drives according to an embodiment of the present invention.

In an embodiment, the real-time data or real-time adjusted queue length may be used to perform load balancing. FIG. 5 illustrates an embodiment of a method for load balancing of the disk drives, which may be implemented by load balancing module 154 according to an embodiment of the present invention. When a new Input/Output command is received or generated (501), the real-time data may be used to calculate (502) the total time it is expected it will take each applicable drive to complete its current queue of commands.

Assume for the purposes of illustration and without loss of generality, that two disk drives, Drive0 and Drive1, in an array of disk drives may be sent the command. That is, each drive is equally able to execute the command. Consider, by way of example, the total time it will take Drive0 to complete its current queue of commands (Current_Q_Time_Drive0) is 50 milliseconds, and the total time it will take Drive1 to complete its current queue of commands (Current_Q_Time_Drive1) is 45 milliseconds. Also assume it will take Drive0 5 milliseconds to complete the new command (New_Command_Time_Drive0) and it will take Drive1 15 milliseconds to complete the same command (New_Command_Time_Drive1). The total times to complete all commands, including if the new command was added to each drive's queue, is calculated (502), which would be 55 ms (50 ms+5 ms) for Drive0 and 60 ms (45 ms+15 ms) for Drive1.

The total times are compared (503). Given that the total time for Drive0 is less than the total time for Drive1, the new command is sent (504) to Drive0 to execute. In an embodiment, as an option, the total time to complete Drive0's current queue may be incremented (505) by the amount of time to complete the new command (e.g., Current_Q_Time_Drive0=Current_Q_Time_Drive0+New_Command_Time_Drive0). The incremented total time value may be used for the next iteration. Although not depicted in FIG. 5, it should be noted that once a command or commands have been executed, adjustments to the total time for each drive may be made to reflect this change.

Figure 6:
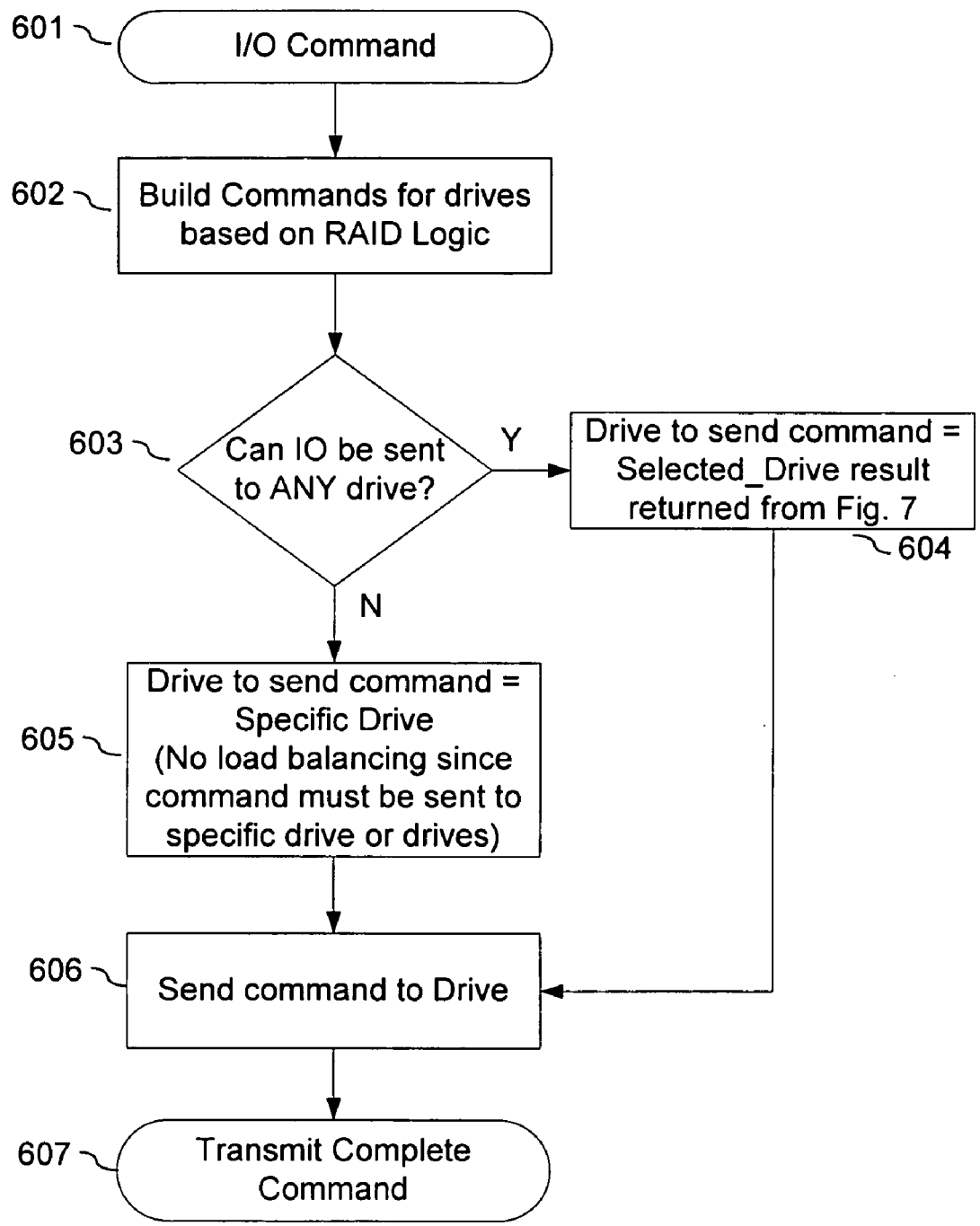
FIG. 6 illustrates an embodiment of a method for handling IO (Input/Output) operations or commands from a computer system according to an embodiment of the present invention.

FIG. 6 illustrates an embodiment of a method for handling IO (Input/Output) commands from a computer system according to an embodiment of the present invention. In an embodiment, a driver receives (601) a command from the operating system. The command is built (602) in accordance with the particular disk array structure. For example, depending on the RAID structure that is being utilized, the command may need to be broken into portions. Accordingly, it should be understood that references to an IO Command may also refer to a portion of that IO command. A determination is made whether the IO command may be sent (603) to any drive or whether it must be sent to a specific drive or drives. To illustrate further, consider a RAID-1 with two drives. An IO command to write data involves writing to both drives since the drives are mirrored; therefore, the command must be sent to both drives. In such cases wherein the command must be sent to a specific disk drive of drives, that disk drive is selected (605) and the command is sent (606) to it. The disk drive will execute the command and may transmit (607) a notification that it is complete. Note that no load balancing could be performed because the command required that it be sent to specific drives.

Consider the same RAID-1, but the IO command is a read command. An 10 command to read data in an RAID-1 may be sent to either disk drive because both disk drives contain the same data. Accordingly, load balancing may be performed. In an embodiment, the drive selected to receive the command (604) may be determined according to one or more of the load balancing algorithms as described herein according to embodiments of the present invention.

Figure 7:
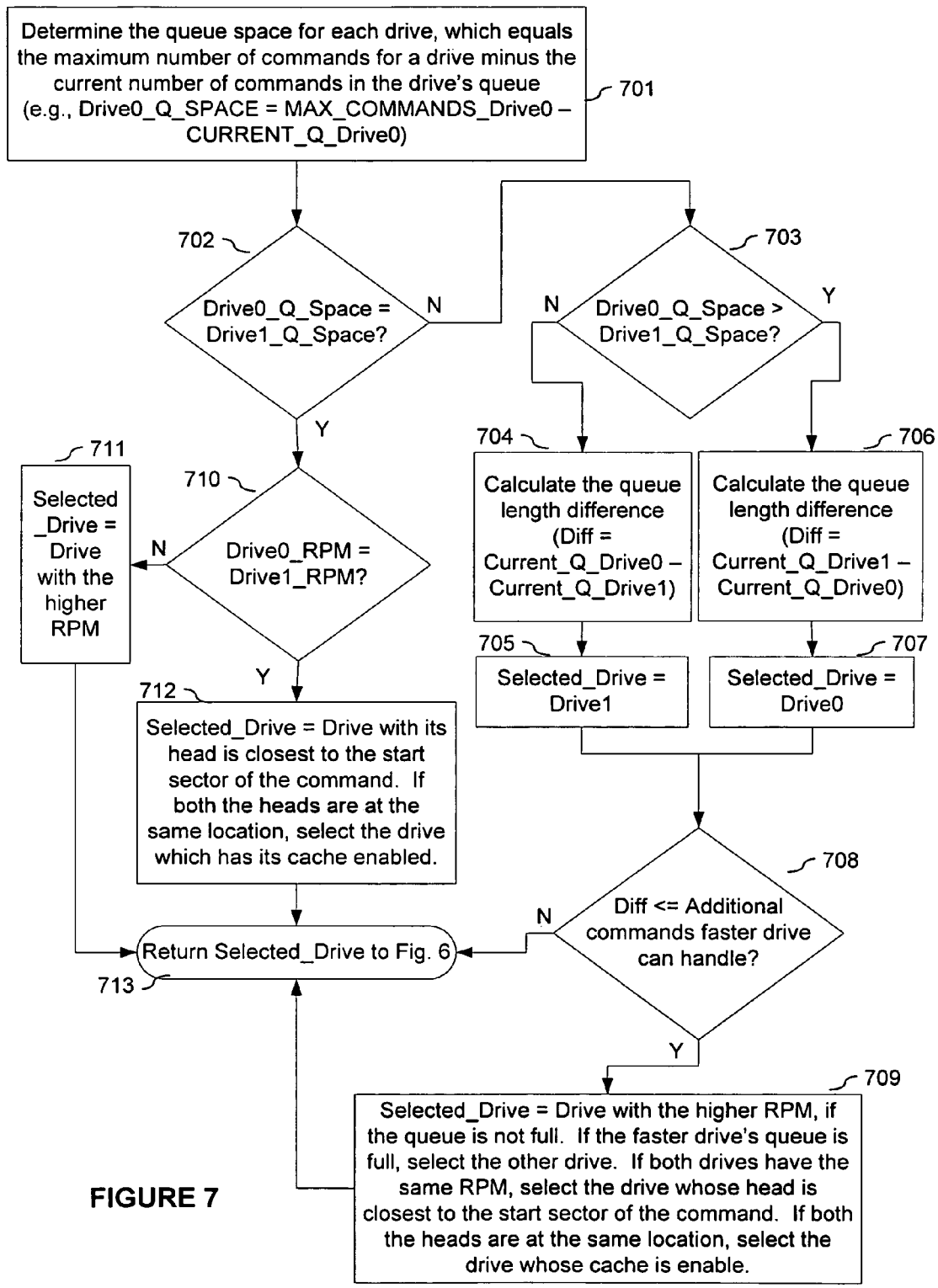
FIG. 7 illustrates an embodiment of a method for load balancing of disk drives according to an embodiment of the present invention.

FIG. 7 illustrates an embodiment of a method for load balancing of the disk drives. Once again, assume for the purposes of illustration and without loss of generality, an array consisting of two disk drives, Drive0 and Drive1.

Initially, the current available queue space for commands (DriveX_Q_SPACE) is calculated for each of the disk drives in the array that can execute the command. For example, the number of additional commands Drive0 may receive before filling its queue is determined from subtracting the current number of commands in its queue (CURRENT_Q_Drive0) from the maximum number of commands Drive0 may hold in its queue (MAX_COMMANDS_Drive0). At start-up, the current number of commands in Drive0's queue will be zero, but as more commands are issued, Drive0 (as with each of the disk drives) may have commands in its queue waiting to be executed.

In an embodiment, the maximum number of commands a disk drive may hold in its queue (MAX_COMMANDS_DriveX) may be determined from one or more to the methods described with respect to FIGS. 3 and 4, above. Since the methods described with respect to FIGS. 3 and 4, above, for setting the maximum number of commands a disk drive may hold in its queue (MAX_COMMANDS_DriveX) were based on RPM, cache properties, and/or real-time response of the drive, the present method for load balancing becomes highly dependent on these factors.

The current available queue space for commands of the disk drives is compared (702) to determine if they have equal space. In the illustrated example, the current available queue space for commands for Drive0 (Drive0_Q_SPACE) is compared with the current available queue space for commands for Drive1 (Drive1_Q_SPACE).

If the current available queue space for commands for the disk drives are equal, the speeds (RPM) of the disk drives are compared (710). If one disk drive is faster than the other, the faster drive is selected (711) to receive the new command. The selected drive value (Selected_Drive) is returned (713) and the command is sent (606) to the disk drive.

If the disk drives have equal speeds, the disk drive with its head closest to the start sector of the command is selected (712). If both the heads are at the same location, the disk drive that has its cache enabled is selected (712). If both disk drives' caches are enabled, either drive may be selected. The selected drive value (Selected_Drive) is returned (713) and the command is sent (606) to the disk drive.

If the current available queue space for the disk drives are not equal, a determination is made (703) which of the disk drives has the largest queue space. The difference in available queue space (DIFF) between each of the disk drives is calculated (704 or 706), and the disk drive with the largest queue space is set (705 or 707) as the selected disk drive to receive the IO command. For example, assume Drive0 has a larger queue space than Drive1. The difference in queue space is calculated, DIFF=Current_Q_Drive1−Current_Q_Drive0 (706), and Drive0 is set (707) as the selected drive.

In an embodiment, before the selected disk drive value is returned, a check is made to determine whether better load balancing might be achieved by not having the command sent to the disk drive with the largest empty queue space. In an embodiment, this check is performed (708) by ascertaining whether the difference in the number of commands between the disk drives is less than or equal to an additional number of commands the faster drive could process. This condition means that if there are more commands in the faster drive's queue but still not enough to keep the faster drive sufficiently busy, than more commands should be sent to its queue.

For purposes of illustration, assume that Drive0 is a slow drive (low RPMs) and Drive1 is a fast drive, and these disk drives are configured as RAID-1. Assume further that Drive1 can process 8 commands more than Drive0 in a given time period. In an embodiment, the rate at which the disk drives can process commands may be obtained from the real-time data drive module. Also assume, for sake of illustration, that Drive0, the slow drive, has 4 commands, while Drive1, the fast drive, has 10 commands. Given the above assumptions, the following calculations will occur:

$$DIFF=10-4=6.$$

Since the different (DIFF) in number of commands in the queue, which is 6, is less than or equal to 8 (the number of commands Drive1 can execute more than Drive0 for any given time), the command may be sent (709) to drive that can handle more commands. Therefore, despite having more commands in its queue, better load balancing is achieved by sending the command to the faster disk drive, in this case, Drive1. This check helps better utilize the queue of the faster drive. In an embodiment, after the queue of the faster drive is full, the commands may be sent (709) to the slower drive.

In an embodiment, if the disk drives have equal speeds, the disk drive with its head closest to the start sector of the command is selected (709). If both the heads are at the same location, the disk drive that has its cache enabled is selected (709). In an embodiment, if both disk drives' caches are enabled, the disk drive previously selected (e.g., Step 705 or Step 707) remains the selected drive to receive the command. In an alternative embodiment, if both disk drives' caches are enabled, either drive may be selected. The selected drive value (Selected_Drive) is returned (713) and the command is sent (606) to the disk drive.

The above description is included to illustrate embodiments of the present invention and is not meant to limit the scope of the invention. One skilled in the art will recognize that the present invention has applications beyond embodiments and illustrated examples. Accordingly, it shall be understood that neither the number of disk drives nor their configuration are critical to the present invention. The scope of the invention is to be limited only by the following claims. From the above discussion, many variations will be apparent to one skilled in the art that would yet be encompassed by the scope of the present invention.

We claim:

1. A method for load balancing responsive to an Input/Output (IO) command that may be equally executed by more than one disk drive in an array of disk drives, the method comprising:

determining a queue space for each of the disk drives in the array of disk drives that may execute the IO command;

comparing the queue space of the disk drives in the array of disk drives that may execute the IO command;

responsive to the queue space of the disk drives in the array of disk drives that may execute the IO command being equal, comparing the speeds of said disk drives:

responsive to one of the disk drives in the array of disk drives that may execute the IO command having the fastest speed, selecting said disk drive to execute the IO command;

responsive to two or more of the disk drives in the array of disk drives that may execute the IO command each having the fastest speed, selecting the disk drive from said two or more disk drives with its head closest to the start sector of the IO command to execute the IO command; and responsive to the queue space of the disk drives in the array of disk drives that may execute the IO command not being equal, identifying from the disk drives in the array of disk drives that may execute the IO command the disk drive with the largest queue space and:

responsive to the difference in queue space between said disk drive with the largest queue space and each of the disk drives in the array of disk drives that may execute the IO command being greater than a predetermined number, selecting said disk drive with the largest queue space to execute the IO command;

responsive to the difference in queue space between said disk drive with the largest queue space and at least one disk drive in the array of disk drives that may execute the IO command being less than or equal to a predetermined number and said at least one disk drive's queue space being greater than zero, selecting the disk drive with the higher revolutions per minute, as selected between said disk drive with the largest queue space and said at least one disk drive, to execute the IO command;

responsive to the difference in queue space between said disk drive with the largest queue space and at least one disk drive in the array of disk drives that may execute the IO command being less than or equal to a predetermined number and said at least one disk drive's queue space being equal to zero, selecting said disk drive with the largest queue space to execute the IO command.

2. The method of claim 1 further comprising the step of setting a command queue length for each of the disk drives in the array of disk drives.

3. The method of claim 2 wherein the step of setting a command queue length comprises the steps of:

for each of the disk drives in the array of disk drives, setting an initial command queue length; and comparing the revolutions per minute (RPM) of at least two disk drives from the array of disk drive and responsive to a first disk drive having a higher RPM than a second disk drive, increasing the first disk drive's command queue length.

4. The method of claim 3 further comprising the steps of:

responsive to a disk drive's cache being enabled, increasing the disk drive's command queue length.

5. The method of claim 4 further comprising the steps of:

determining a time value to complete an IO command for a disk drive in the array of disk drives; and adjusting the disk drive's command queue length based upon the time value.

6. The method of claim 5 wherein the step of determining a time value to complete an IO command for a disk drive in the array of disk drives comprises the steps of:

sending an IO command to a disk drive in the array of disk drives;

obtaining a first timestamp when the IO command was sent to the disk drive;

responsive to a notification that the IO command has been executing, obtaining a second timestamp; and calculating the time value as the difference between the first and second timestamps.

7. The method of claim 1 wherein the step of:

responsive to the difference in queue space between said disk drive with the largest queue space and at least one disk drive in the array of disk drives that may execute the IO command being less than or equal to a predetermined number and said at least one disk drive's queue space being greater than zero, selecting the disk drive with the higher revolutions per minute, as selected between said disk drive with the largest queue space and said at least one disk drive, to execute the IO command, further comprises:

responsive to said disk drive with the largest queue space and said at least one disk drive having the same revolutions per minute, selecting the disk drive, as selected between said disk drive with the largest queue space and said at least one disk drive, with its head position closer to the start sector of the IO command to execute the IO command.

8. The method of claim 7 wherein the step of:

responsive to said disk drive with the largest queue space and said at least one disk drive having the same revolutions per minute, selecting the disk drive, as selected between said disk drive with the largest queue space and said at least one disk drive, with its head position closer to the start sector of the IO command to execute the IO command, further comprises:

responsive to said disk drive with the largest queue space and said at least one disk drive having the same head position, selecting a disk drive, as selected between said disk drive with the largest queue space and said at least one disk drive, that has its cache enabled to execute the IO command.

9. The method of claim 1 wherein the step of:

responsive to two or more of the disk drives in the array of disk drives that may execute the IO command each having the fastest speed, selecting the disk drive from said two or more disk drives with its head closest to the start sector of the IO command to execute the IO command;

further comprises:

responsive to two or more of the disk drives in the array of disk drives that may execute the IO command each having the same head position, selecting a disk drive from said two or more disk drives that has its cache enabled to execute the IO command.

10. The method of claim 1 wherein the predetermined number correlates to an additional number of commands a disk drive may execute in a time period.

11. A computer program product comprising computer-executable instructions embodied in a computer-readable medium for performing the method of claim 1.

12. A controller comprising:

an interface for receiving an Input/Output (IO) command from a host computer;

a command queue length module, communicatively coupled to the interface, for setting a command queue length for at least one disk drive in the array of disk drives;

a real-time drive data module, communicatively coupled to the command queue length module, for determining a time value to complete an IO command for a disk drive in the array of disk drives;

a load balancing module, communicatively coupled to the command queue length module, for selecting a disk drive from the array of disk drives to execute the IO command;

a peripheral interface, communicatively coupled to the load balancing module, for interfacing with an array of disk drives;

wherein the load balancing module is adapted to perform the steps of:

comparing the queue space of the disk drives in the array of disk drives that may execute the IO command;
responsive to the queue space of the disk drives in the array of disk drives that may execute the IO command being equal, comparing the speeds of said disk drives:
responsive to one of the disk drives in the array of disk drives that may execute the IO command having the fastest speed, selecting said disk drive to execute the IO command;
responsive to two or more of the disk drives in the array of disk drives that may execute the IO command each having the fastest speed, selecting the disk drive from said two or more disk drives with its head closest to the start sector of the IO command to execute the IO command; and
responsive to the queue space of the disk drives in the array of disk drives that may execute the IO command not being equal, identifying from the disk drives in the array of disk drives that may execute the IO command the disk drive with the largest queue space and:
responsive to the difference in queue space between said disk drive with the largest queue space and each of the disk drives in the array of disk drives that may execute the IO command being greater than a predetermined number, selecting said disk drive with the largest queue space to execute the IO command;
responsive to the difference in queue space between said disk drive with the largest queue space and at least one disk drive in the array of disk drives that may execute the IO command being less than or equal to a predetermined number and said at least one disk drive's queue space being greater than zero, selecting the disk drive with the higher revolutions per minute, as selected between said disk drive with the largest queue space and said at least one disk drive, to execute the IO command;
responsive to the difference in queue space between said disk drive with the largest queue space and at least one disk drive in the array of disk drives that may execute the IO command being less than or equal to a predetermined number and said at least one disk drive's queue space being equal to zero, selecting said disk drive with the largest queue space to execute the IO command.

13. The controller of claim 12 wherein the steps of:
responsive to the difference in queue space between said disk drive with the largest queue space and at least one disk drive in the array of disk drives that may execute the IO command being less than or equal to a predetermined number and said at least one disk drive's queue space being greater than zero, selecting the disk drive with the higher revolutions per minute, as selected between said disk drive with the largest queue space and said at least one disk drive, to execute the IO command,
further comprises:
responsive to said disk drive with the largest queue space and said at least one disk drive having the same revolutions per minute, selecting the disk drive, as selected between said disk drive with the largest queue space and said at least one disk drive, with its head position closer to the start sector of the IO command to execute the IO command.

14. The controller of claim 13 wherein the steps of:
responsive to said disk drive with the largest queue space and said at least one disk drive having the same revolutions per minute, selecting the disk drive, as selected between said disk drive with the largest queue space and said at least one disk drive, with its head position closer to the start sector of the IO command to execute the IO command,
further comprises:
responsive to said disk drive with the largest queue space and said at least one disk drive having the same head position, selecting a disk drive, as selected between said disk drive with the largest queue space and said at least one disk drive, that has its cache enabled to execute the IO command.

15. The controller of claim 12 wherein the steps of:
responsive to two or more of the disk drives in the array of disk drives that may execute the IO command each having the fastest speed, selecting the disk drive from said two or more disk drives with its head closest to the start sector of the IO command to execute the IO command;
further comprises:
responsive to two or more of the disk drives in the array of disk drives that may execute the IO command each having the same head position, selecting a disk drive from said two or more disk drives that has its cache enabled to execute the IO command.

16. The controller of claim 12 wherein load balancing module is adapted to perform the steps of:
calculating, for each disk drive in the array of disk drive that could execute a new IO command, a total time the disk drive will take to execute all IO commands in its queue plus the time to execute the new IO command; and
selecting the disk drive with the shortest total time to execute the new IO command.

17. A system capable of performing load balancing of Input/Output (IO) commands comprising:
a host computer;
a controller, communicatively coupled to the host computer, for receiving IO commands from the host computer and for load balancing the IO commands; and
an array of disk drives, communicatively coupled to the controller, for receiving and executing IO commands;
wherein the controller load balances a new IO command by:
setting a command queue length for each disk drive based upon at least one selected from the group comprising: disk drive RPM, disk drive cache, and real-time disk drive data;
selecting a disk drive to execute the new IO command based upon command queue space and at least one selected from the group comprising: disk drive RPM, disk drive cache, real-time disk drive data, and head position;
an interface for receiving an Input/Output (IO) command from the host computer;
a command queue length module, communicatively coupled to the interface, for setting a command queue length for at least one disk drive in the array of disk drives;
a real-time drive data module, communicatively coupled to the command queue length module, for determining a time value to complete an IO command for a disk drive in the array of disk drives;

a load balancing module, communicatively coupled to the command queue length module, for selecting a disk drive from the array of disk drives to execute the IO command; and a peripheral interface, communicatively coupled to the load balancing module, for interfacing with an array of disk drives;

wherein the load balancing module is adapted to perform the steps of:

comparing the queue space of the disk drives in the array of disk drives that may execute the IO command;

responsive to the queue space of the disk drives in the array of disk drives that may execute the IO command being equal, comparing the speeds of said disk drives:

responsive to one of the disk drives in the array of disk drives that may execute the IO command having the fastest speed, selecting said disk drive to execute the IO command;

responsive to two or more of the disk drives in the array of disk drives that may execute the IO command each having the fastest speed, selecting the disk drive from said two or more disk drives with its head closest to the start sector of the IO command to execute the IO command; and responsive to the queue space of the disk drives in the array of disk drives that may execute the IO command not being equal, identifying from the disk drives in the array of disk drives that may execute the IO command the disk drive with the largest queue space and:

responsive to the difference in queue space between said disk drive with the largest queue space and each of the disk drives in the array of disk drives that may execute the IO command being greater than a predetermined number, selecting said disk drive with the largest queue space to execute the IO command;

responsive to the difference in queue space between said disk drive with the largest queue space and at least one disk drive in the array of disk drives that may execute the IO command being less than or equal to a predetermined number and said at least one disk drive's queue space being greater than zero, selecting the disk drive with the higher revolutions per minute, as selected between said disk drive with the largest queue space and said at least one disk drive, to execute the IO command; and responsive to the difference in queue space between said disk drive with the largest queue space and at least one disk drive in the array of disk drives that may execute the IO command being less than or equal to a predetermined number and said at least one disk drive's queue space being equal to zero, selecting said disk drive with the largest queue space to execute the IO command.

\* \* \* \* \*